United States Patent [19]

Steiner

[11] 4,380,070
[45] Apr. 12, 1983

[54] AUTOMATIC CIRCUIT IDENTIFIER

[75] Inventor: William G. Steiner, Marietta, Ga.

[73] Assignee: Lockheed Corporation, Burbank, Calif.

[21] Appl. No.: 234,686

[22] Filed: Feb. 17, 1981

Related U.S. Application Data

[63] Continuation-in-part of Ser. No. 96,030, Nov. 20, 1979, Pat. No. 4,291,404.

[51] Int. Cl.³ .............................................. G06F 11/22
[52] U.S. Cl. ...................................... 371/20; 371/15; 324/73 R
[58] Field of Search ............................ 371/20, 15, 25; 324/73 R, 73 AT; 179/175; 364/200

[56] References Cited

U.S. PATENT DOCUMENTS

| | | | |
|---|---|---|---|
| 4,074,189 | 2/1978 | Harms et al. | 324/73 R |
| 4,108,358 | 8/1978 | Niemaszyk et al. | 371/20 |
| 4,125,763 | 11/1978 | Drabing et al. | 371/20 |
| 4,138,599 | 2/1979 | Munter | 179/175 |
| 4,168,527 | 9/1979 | Winkler | 371/20 X |
| 4,174,805 | 11/1979 | Fulks et al. | 371/20 |
| 4,180,203 | 12/1979 | Masters | 371/20 |
| 4,291,404 | 9/1981 | Steiner | 371/20 |
| 4,300,207 | 11/1981 | Eivers et al. | 324/73 R X |
| 4,308,615 | 12/1981 | Koegel et al. | 371/20 |

*Primary Examiner*—David H. Malzahn
*Attorney, Agent, or Firm*—John J. Sullivan

[57] ABSTRACT

A hand held apparatus for automatically identifying a hybrid or monolithic integrated circuit or any standard circuit module having a known pin configuration (10) and an unknown identity. A plurality of test instructions (FIG. 6) for devices of known identity are stored in a test procedure memory (22) and sequentially provided (125) to the unit under test until the unit either passes a test thus revealing its identity (137) or fails all tests in the memory (145). The socket (10) is connected to a pair of peripheral chips (25a, 25b) having pin definable input/output ports (46, 65, 66) which are used selectively to treat any pin as input, output, or supply.

5 Claims, 7 Drawing Figures

AUTOMATIC CIRCUIT IDENTIFIER

CROSS REFERENCE TO RELATED APPLICATION

This application is a continuation in part of Application Ser. No. 96,030, now U.S. Pat. No. 4,291,404, filed Nov. 20, 1979 entitled "AUTOMATIC CIRCUIT TESTER WITH IMPROVED VOLTAGE REGULATOR".

TECHNICAL FIELD

The present invention relates to circuit testing devices, and relates more particularly to portable testing apparatus with a programmable interface between a unit under test and a testing apparatus which provides plurality of tests for a plurality of known different circuits and provides identification of the unit under test upon detection of a passed test.

BACKGROUND OF THE INVENTION

The present invention relates to a portable circuit identifier. In recent years there has been a virtual explosion in the market for integrated circuit electronics, both analog and digital. In many applications where high precision and tolerance of extreme environmental conditions are required, hybrid integrated circuits and various standard modules are also popular.

Today there are hundreds of standard integrated circuits available, all of which fit in one of several standard socket configurations. The most widely known configuration is a standard dual-in-line (DIP) socket for circuits having between four and sixteen pins. More recently, twenty-four, forty, and sixty-four pin dual-in-line configurations having wider spacing between the rows of sockets have become popular in the field of large scale integrated circuits (LSI). Additionally, SEM and SEEM standard modules are commonly used in military equipment. As greater and greater circuit density has been obtained in the field of integrated circuits, together with the ability to fabricate circuits on relatively large chips, the field of large scale integrated circuits has provided extremely complex functions available in standard integrated circuit (IC) packages.

The proliferation of the use of intregrated circuits in consumer products has created a need for a portable testing device for complex integrated circuits. A novel, very efficient portable integrated circuit tester constructed of hardware similar to the preferred embodiment of the present invention is shown in applicant's co-pending application Ser. No. 96,030, now U.S. Pat. No. 4,291,404, filed Nov. 20, 1979 entitled "AUTOMATIC CIRCUIT TESTER WITH IMPROVED VOLTAGE REGULATOR". The invention disclosed herein is related in that the preferred embodiments are physically constructed according to FIG. 3 herein. Furthermore, there are common aspects of the interconnections used in the invention of said co-pending application and the present invention. Therefore, said co-pending application Ser. No. 96,030 is hereby incorporated by reference exactly as if set forth in full herein.

The apparatus shown in application Ser. No. 96,030 is a device for testing whether a circuit placed in a test socket is properly performing the functions of a particular selected identified circuit. In other words, it is necessary to know the identity of the circuit in order to ascertain whether the circuit is operating properly.

The great increase in use of integrated circuits, and particularly the use of a large number of different circuits housed in identical packages, together with the custom of labeling circuits with "in-house" numbers, has caused serious problems for field service personnel. The nature of one of the problems is basically a simple ignorance of the identity of a particular integrated circuit.

As will be appreciated by those familiar with modern electronic manufacturing customs, many original-equipment manufacterers (OEM) order standard integrated circuits in large quantities with the purchaser's "in-house" part number designated thereon and omit the generic identifier for the device. This custom is used in order to keep the internal part numbering scheme of the OEM purchaser in a form which the purchaser wants, and provides a way to force ultimate consumers to buy spare parts from the OEM.

It will therefore be appreciated that in field service work one often encounters a situation where the only "missing link" in the chain of knowledge necessary to repair a particular item is the generic identity of an integrated circuit labeled with an in-house number.

It is therefore desirable to provide apparatus which can effect the identification of a particular circuit in a standard package.

Furthermore, on many pieces of military equipment, such as a particular airplane or submarine, it is known that only certain types of standard modules are used in the particular piece. It is therefore desirable to provide apparatus which can rapidly test a standard module to determine if its operation corresponds to proper operation of any member of a known set of possible modules.

SUMMARY OF THE INVENTION

The present invention provides apparatus which will very quickly provide a plurality of tests for particular transfer characteristics among the pins of a standard socket in order to identify a circuit under test inserted into the socket.

It should be understood that, as used herein, the term "hybrid integrated circuit" is used broadly to include both the definition in ANSI/IEEE standard 100-1977 and any modular arrangement of electronic components housed in a unit with a predetermined connecting pin arrangement.

Preferably the present invention includes a plurality of test procedures stored in memory to ascertain proper operation of a plurality of integrated circuits, all of which are arranged to fit the particular socket provided on the test apparatus.

The present invention is selectively operable to initiate a sequence of tests, which, once began, will continue through the entire test repertoire of the test apparatus until the circuit under test provides a complete set of correct responses to particular test inputs indicative of the circuit's identity or, until the test repertoire is exhausted. In the first instance, an identification signal (preferably a visible alpha-numeric output) is provided to identify the particular circuit under test to the user. In the latter instance, an output is generated indicating either that the circuit under test is of a type different from the plurality of circuits in the test repertoire or that the circuit is of a type within the test repertoire but is not functioning properly.

In its preferred form, the present invention includes a bidirectional port arrangement connected to a particular standard socket which may be operated under the control of a dedicated microcomputer to provide pin definitions at the pins of the standard socket. The pin definitions include input drive, output loading, power supply and ground conditions.

It is therefore an object of the present invention to provide a heretofore unknown, very rapid, apparatus for identifying the transfer characteristic of a particular circuit arranged in a standard package which may be not be adequately marked for the user to identify same.

It is a further object of the present invention to provide an automatic circuit identifier having a plurality of definable inputs connected to the pins of a standard socket configuration.

It is still a further object of the present invention to provide a circuit identification apparatus having a plurality of test procedures, each of which comprises a plurality of test conditions providing a particular set of inputs and testing for a particular responsive output in which the failure of the circuit under test to provide the particular responsive output to any test condition will cause the apparatus to initiate another test procedure.

These and other objects of the present invention will become apparent from the description of the preferred embodiment of the present invention to follow.

DETAILED DESCRIPTION

Figure 1:
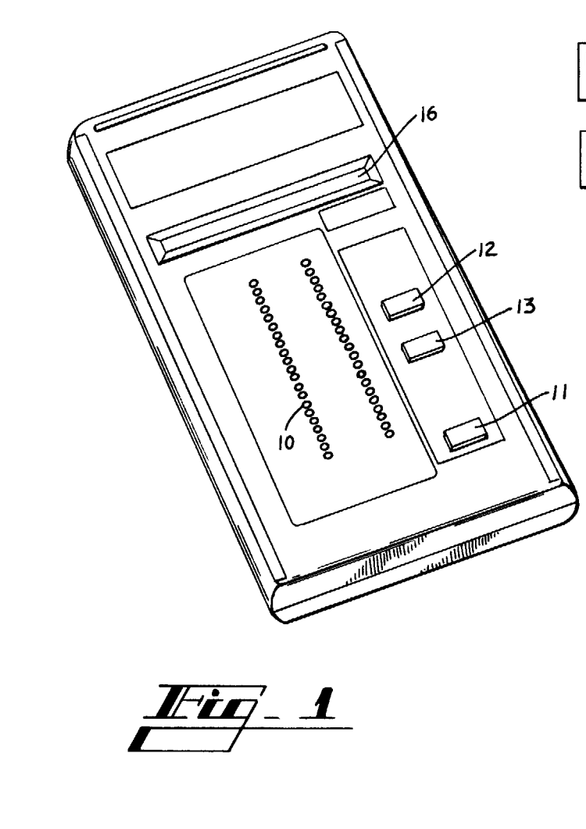
FIG. 1 is a pictorial view of a preferred embodiment of the present invention.

Turning to FIG. 1, the pictorial view of the preferred embodiment of the present invention is shown. The simplicity of operating an embodiment of the present invention may be appreciated from the simplicity of the preferred embodiment as shown in FIG. 1. Socket 10 provides a means for making an electrical connection to a unit under test (UUT). As shown in FIG. 1, socket 10 is embodied by a standard forty pin dual in line socket. It will be appreciated by those skilled in the art that other socket configurations such as those for the Standard Electronic Module (SEM) or the Support Equipment Electronic module (SEEM) are available and that simple adapters from socket 10, or other socket configurations, may be used with the present invention.

The preferred embodiment of the present invention is controlled by the operator through the use of three external switches, namely on/test switch 11 and two double-detent switches 12 and 13 which are, respectively, forward (FWD) and reverse (REV).

An alpha numeric display 16 is also provided on the preferred embodiment. In the preferred embodiment, a four character display is used and this has been found to be sufficient for identification of one hundred or more standard circuit modules. It is of course possible to use a greater or lesser number of characters in display 16.

Since use of the preferred embodiment of the present invention is so simple, it will be described in conjunction with FIG. 1. The described operations will be related to the internal machine functions in the description below.

As will be described in further detail hereinbelow, the preferred embodiment of the present invention includes memory which contains instructions for testing approximately one hundred standard devices which may be accepted by socket 10. Internal to the preferred embodiment is a table (or more precisely a means for generating a table) which is arranged in alpha numeric order. This table is referred to as the "roll table" throughout the specification.

In order to activate the preferred embodiment, the user first depresses on-test button 11 which will turn the machine on. Switches 12 and 13 are double-detent switches. Therefore the depression of one of these switches a first distance into the device closes a first set of contacts and further depresion of the switch closes a second set of contacts. The preferred embodiment monitors the output voltage of its battery and will display an appropriate message indicating that battery voltage is too low and the battery should be replaced or recharged.

The unit may be turned off either by holding on test button 11 in a depressed state for a predetermined period of time (approximately two seconds in the preferred embodiment) or by failing to provide any input to the device for a second predetermined period of time, approximately thirty seconds in the preferred embodiment. It will therefore be appreciated that any stored test routine for a particular circuit plugged into socket 10 may be executed quickly and simply to the use of only three external inputs (switches 11, 12 and 13).

Figure 2:
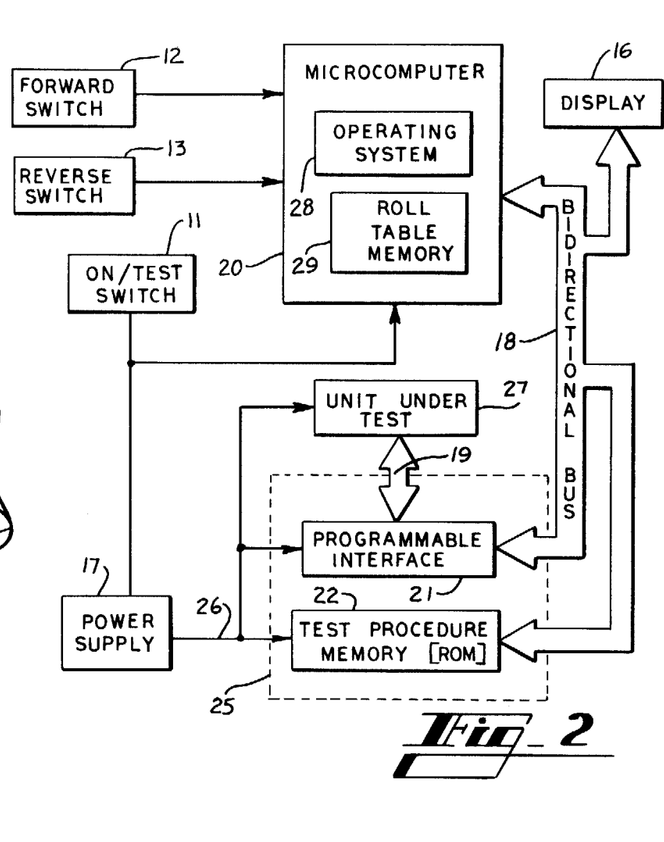
FIG. 2 is a block diagram of the preferred embodiment of the present invention.

Turning to FIG. 2, a block diagram of the preferred embodiment may be seen. As may be seen in FIG. 2, switches 11, 12 and 13 are the only user operated external inputs required to control the present invention. Display 16 is shown as a block in FIG. 2. As may be seen from FIG. 2, switches 12 and 13 are directly connected to an input of microcomputer 20. On/test switch 11 is connected to both microcomputer 20 and power supply 17. Microcomputer 20 is connected with the remainder of the preferred embodiment via a bidirectional bus 18 which in FIG. 2 will be understood to include a bidirectional data bus, an address bus, and appropriate control lines.

Bus 18 is connected to I/O/memory block 25 which includes subcomponents programmable interface 21, and read-only memory 22 which contains instructions for the repertoire of test procedures for the unit under test. A generalized connection 19 to unit under test 27 is shown in FIG. 2. It will be understood that in the preferred embodiment this connection will manifest itself as socket 10 shown in FIg. 1. Line 26 in FIG. 2 shows that power supply 17 supplies power to I/O/memory block 25 and unit under test 27. Power is supplied to I/O/memory block 25 and unit under test 27 only under certain specified conditions under the control of microcomputer 20, thus minimizing the drain on the battery of power supply 17.

Figure 3:
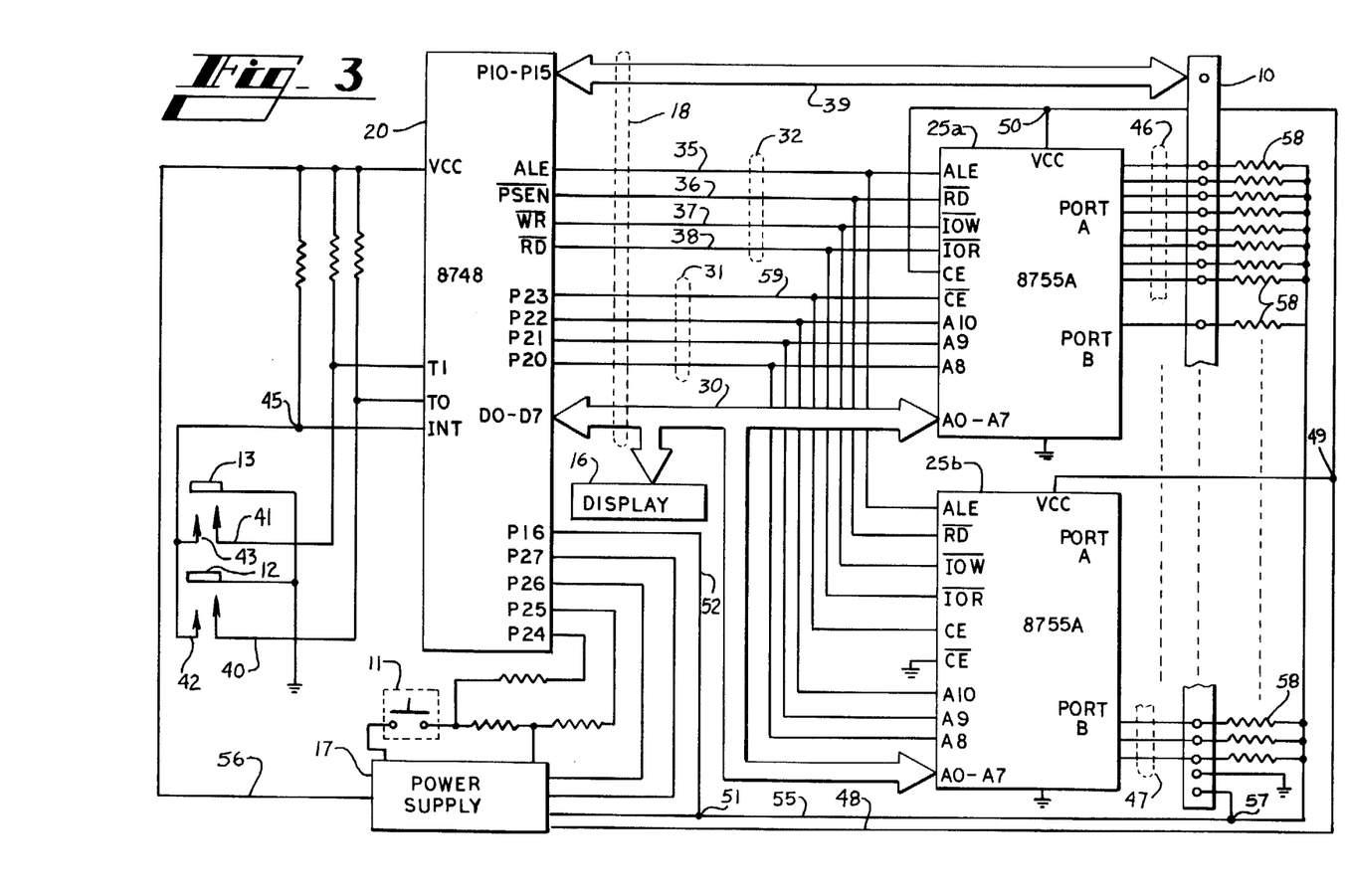
FIG. 3 is a partially schematic, partially block diagram of the preferred embodiment of the present invention.

Turning now to FIG. 3, the preferred embodiment of the present invention may be seen in greater detail. In the preferred embodiment, microcomputer 20 is embodied as a type 8748 eight bit one chip microcomputer currently manufactured by Intel Corporation of Santa Clara, California. Detailed descriptions of the functioning of the 8748 microcomputer are available in "MCS-48 Microcomputer Users Manual", ©1977, which is hereby incorporated by reference. Sufficient detail will be presented herein to enable one skilled in the art to understand how the microcomputer works in the present invention, and how other microcomputers could be used to construct an embodiment of this invention.

The type 8748 microcomputer includes 1K of eight bit erasable programmable read only memory (EPROM). It will be appreciated by those skilled in the art that a type 8048 microcomputer could be used in the mass production of the preferred embodiment of the present invention since the type 8048 includes a masked programmable read only memory.

I/O/memory 25 (shown in FIG. 2) is embodied as two integrated circuits 25a and 25b shown in FIG. 3. Each of these circuits is an 8755A EPROM with I/O, currently manufactured by Intel Corporation of Santa Clara, California. From the description of the 8755A to follow, it will be apparent to those skilled in the art how other similar combinations of read only memory and I/O ports may be used to construct an embodiment of the present invention. However, it is to be understood that the novel use of this otherwise standard device is one of the inventive features of the present invention.

Power supply 17 is shown as a block in FIG. 3. Recall from the discussion of FIG. 2 that the 1K of memory for microcomputer 20 may be thought of as being divided into two portions, an operating system memory (28 in FIG. 2) and a roll table memory (29 in FIG. 2). The operating system memory (28 in FIG. 2) will be understood to include instructions for running the identification routine (FIG. 4B) while the specific instructions for the plurality of test proceedures reside in chips 25a and 25b.

The 16K EPROM associated with each of the 8755A chips 25a and 25b is a 2KX8 memory and contains the program instructions for a plurality of test procedures for various known devices. It is to be understood that since each of chips 25a and 25b contain 2K eight bit words, a total of 4K external memory addresses must be accessible in the preferred embodiment shown in FIG. 3. Therefore, twelve bits are required to address the external memory containing test procedure instructions in chips 25a and 25b.

The generalized bus 18 of FIG. 2 is shown as 18 in FIG. 3 and includes the following components; an eight bit bidirectional bus 30, a four bit quasi bidirectional bus 31 connected to one half of an eight bit bidirectional port from microcomputer 20; a four control line bus designated 32 comprising address latch enable line 35 (ALE), negated program store enable line 36 (PSEN), negated write line 37 (WR), and negated read line 38 (RD); and, a six bit bus 39 connected to a portion of another eight bit quasi bidirectional port from microcomputer 20. Six bit bus 39 connects directly to six pins of socket 10. Bus 39 will be understood to have pull up resistors internal to microcomputer 20 associated therewith and therefore does not need external pull up resistors.

Forward and reverse switches 12 and 13 have a pole connected to ground. As has been described hereinabove, these switches are double detent switches, and each contact for each detent may be seen in FIG. 3. The first level contact of switch 12 is designated 40 while the second contact thereof is designated 42. Thus, it will be understood that depression of switch 12 to a first level will ground contact 40 and depression of said switch to a second level will ground both contacts 40 and 42. From FIG. 3 it may be seen that switch 13 operates in an analogous fashion. Note that contacts 42 and 43 of switches 12 and 13, respectively, are electrically identical and therefore the depression to the second level of either switch will ground point 45 which is connected to an input of microcomputer 20 designated as interrupt (INT). The operation of switches 12 and 13 is described in detail in co-pending application Ser. No. 96,030. For the present invention, it is sufficient to understand that switches 12 and 13 cause the roll table to be generated forward and backward.

The outputs of power supply 17 appear on lines 48, 55, and 56. Line 56 supplies power to microcomputer 20 and to resistors associated with switches 12 and 13. Line 48 supplies power to chips 25a and 25b where it is tapped at points 49 and 50. Line 55 from power supply 17 supplies power to the unit under test at point 57 and to the external pull up resistors 58 which are connected to the receptors of socket 10.

It is to be understood that while socket 10 is shown in FIG. 3 as having a dedicated power supply and ground pin as is the case, for example, with the Standard Electronic Module (SEM), various pins of socket 10 may be defined as power supply and ground leads in the same manner as other input drive conditions and output loading conditions are defined.

As may be seen from FIG. 3, the lower eight address bits, A0-A7 of I/O/memory chips 25a and 25b are tied to bidirectional bus 30. The upper three address bits are tied to three bits of bus 31. Note that the P23 output of microcomputer 20 is tied to the negated chip enable (CE) of chip 25a and to the true chip enable of chip 25b. Therefore, the P23 output of microcomputer 20 which appears on line 59 may be thought of as the most significant address bit of an address bus for accessing chips 25a and 25b in that it will select one chip or the other.

Socket 10 as shown in FIG. 3 is representative of the forty pin socket 10 shown in FIG. 1, and the inputs and outputs to the socket terminals are shown in FIG. 3. Thirty-two pins of socket 10 are attached to four eight-bit ports from chips 25a and 25b. The port A from I/O chip 25a is designated 46 and three bits of port B of I/O chip 25b are shown as 47 in FIG. 3. It is to be understood that each of these eight bit ports is an eight bit bidirectional port having pull up resistors 58 tied externally thereto. Six receptacles from socket 10 are connected to bus 39 from pins P10-P15 of microcomputer 20.

It is to be understood that once switches 12 and 13 have been manipulated in order to select the identification procedure for the unit under test which is plugged into socket 10, depression of test button 11 will cause the preferred embodiment to sequentially execute a plurality of test procedures via the outputs from the bidirectional ports of I/O/memory chips 25a and 25b and bus 39 in order to ascertain the identity of the UUT.

The Roll Table

As is noted above, the present invention is related to the invention shown in co-pending application Ser. No. 96,030. The preferred embodiment of the present invention makes use of a roll table memory structure similar to that shown in said co-pending application. Therefore, a detailed explanation of the features of the roll table of the present invention which are similar to those of the apparatus disclosed in said co-pending application will not be set forth herein in detail.

Briefly, the roll table elements which reside in roll table memory 29 (FIG. 2) contain the memory words necessary to generate, via an iterative scheme, the names of circuits for which test procedures reside in the test procedure memory in order that the names may be shown in display 16. Each element of the roll table will comprise between three and six eight bit bytes of roll table memory 29. One to four of the bytes for each roll table element comprise a flag bit and a seven bit word in ASCII code. Each of the seven bit words of ASCII code correspond to a new letter or number (in ASCII code) which is different from a word or number in the immediately preceding element of the roll table. The flag bit is made equal to one to denote the last ASCII code word in that particular roll table element.

The remaining two bytes provide a twelve bit address pointer pointing to a twelve bit address in test procedure memory 22 (FIG. 2) which resides in the 8755a chips. This address contains the first step of the test procedure for the particular circuit identified by the alpha numeric display generated by that particular roll element. As is set forth in said co-pending application, the twelve bit address pointer comprises: (1) the four least significant bits of the next to last byte in the roll table element; and (2) the following eight bit byte which is the last byte in the table element.

Figure 4A:
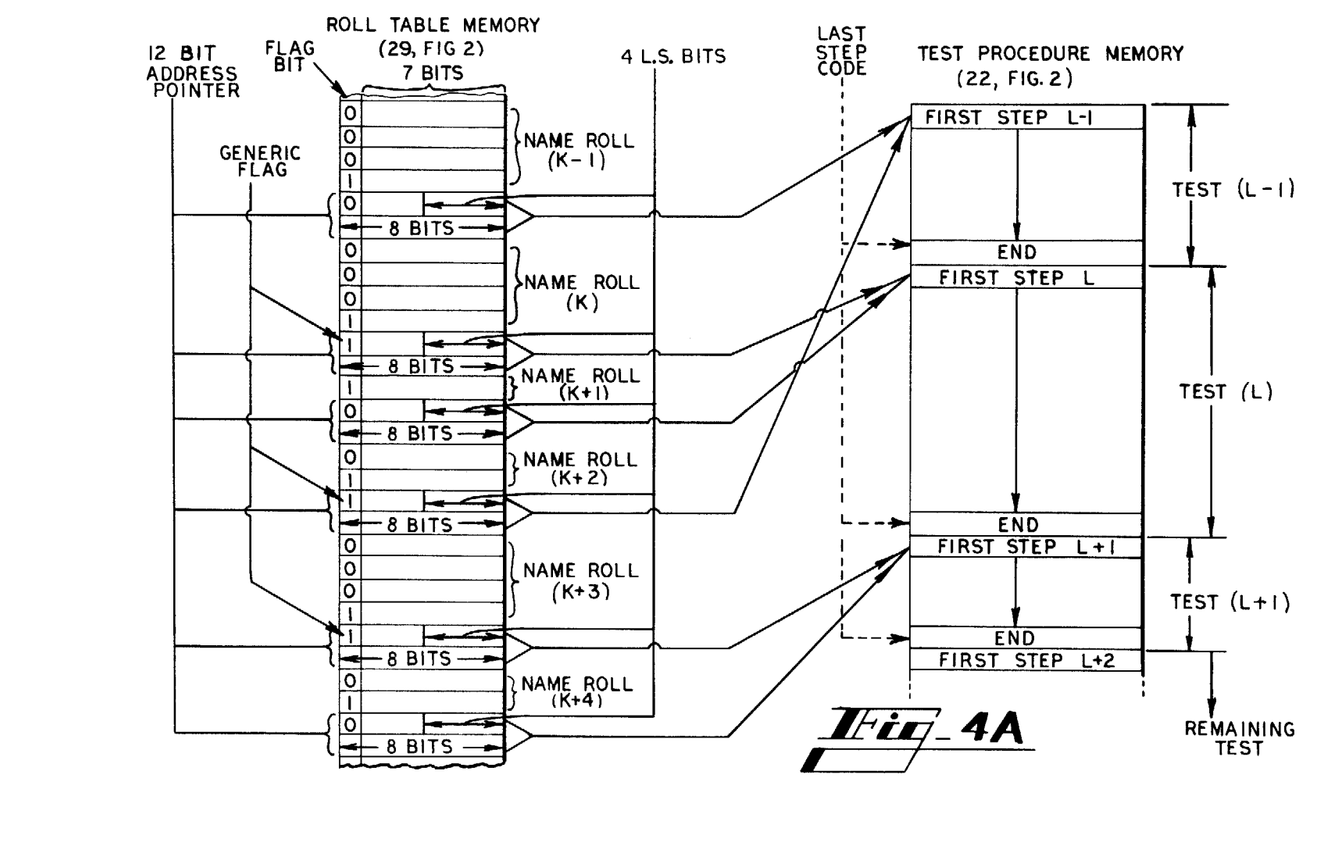
FIG. 4A is a diagram illustrating the relationship between the roll table memory structure and the text procedure instructions.

An improvement in the memory structure of the roll table over the roll table memory structure disclosed in co-pending application Ser. No. 96,030 is shown in FIG. 4A. In connection with the problem of being presented with integrated circuit devices identified only by house numbers, which is the subject matter of the present invention, it has been found to be useful to have a roll table which generates some in-house numbers for devices to be tested as well as generic names for the devices for which a test procedure exists in the test repertoire.

For example, if the user of the present invention or the invention shown in co-pending application Ser. No. 96,030 is in an environment which requires servicing of many pieces of equipment manufactured by a particular OEM using in-house numbers, it is desirable to include in the roll table that OEM's in-house numbers for certain generic circuits so that they may be tested when the apparartus is used as a testing device for a circuit of known identity.

In order to effect this improvement to the apparatus shown in said co-pending application, the invention herein has provided a novel use for one of the four unused bits of the first byte of the address pointer in each roll table element. While this improvement is specifically directed to an improved device of the type shown in the above-referenced co-pending application, the particular scheme for effecting this improvement is encountered in the operation of the present invention and, in a manner to be described hereinbelow, is used to increase the speed at which the present invention operates through a roll table containing both generic and nongeneric (in-house) names for known circuits.

Turning now to FIG. 4A, an exemplary portion of the roll table memory 29 is shown on the left hand side with a block diagram of an exemplary portion of test procedure memory 22 shown on the right hand side.

The portion of the roll table memory shown on FIG. 4A includes six roll table elements (K-1) through (K+4). On the right hand side of FIG. 4A the block diagram represents the steps for three exemplary test procedures labeled as test (L-1) through test (L+1). The last byte of each test procedure contains a dedicated code indicating completion of the particular test. This is shown as "END" in FIG. 4A. It is also possible to dedicate one bit of each byte as a last step flag.

In the structure of the roll table memory as shown in FIG. 4A, it may be seen that the most significant bit for each byte, except the second byte of the twelve bit address pointer, is a flag bit. As is illustrated in FIG. 4A, the flag bit is set at one to denote the end of the name of each roll table element in a sequence of bytes representing a name. The flag bit in the address pointers is set at one to denote the preceding name is generic.

As was noted above, the name of the roll table element is contained in between one and four bytes, each of which denotes a change in an alpha numeric character (beginning with the rightmost character displayed) from the name of the previous element. It will therefore be appreciated that a NAME portion of a roll table element containing four bytes is indicative of a change in the leftmost alpha numeric character displayed, and a roll table NAME element containing three bytes is indicative of no change in the leftmost character from the previous roll table element, but includes a change in the character next to the leftmost character. This reasoning continues to the conclusion that a roll table element having a NAME portion consisting of one byte indicates that the three leftmost alpha numeric characters are identical to the previous roll table element name and only the rightmost character is changed.

It will therefore be appreciated that in the example shown in FIG. 4A, roll table element (K-1) contains a leftmost character different from roll table element (K-2). Similarly, the leftmost character is changed in proceeding from roll table (K-1) to roll table element (K). Also it may be seen that only the rightmost character differs in going from roll element (K) to roll element (K+1).

Since the one in the flag bit position of the last byte of the roll table element NAME portion indicates that the seven following bits are the ASCII code for the last byte to be changed in that particular roll table element, it will be understood that the operating system of the present invention treats the next two bytes as containing a twelve bit address pointer pointing to the first step of the test procedure for the circuit corresponding to the name of the roll table element. In the example shown, assume that the NAME portion of element roll (K) contained the characters 7408 (in the order 8047 proceeding sequentially through the roll table memory) so that the name of roll element (K) was 7408. As will be appreciated by those skilled in the art, this corresponds to a generic name for a quad two input AND gate TTL circuit. It will therefore be appreciated that the four least significant bits of the next byte after the NAME of roll (K), together with the following eight bit byte, comprise a twelve bit address pointer pointing to test (L) in the test procedure memory. It will therefore be appreciated that in the example given, test (L) provides the appropriate steps for testing a 7408 quad dual input AND gate integrated circuit.

As may be seen from FIG. 4A, the last byte of the NAME portion of each roll table element is identified by a one in the flag bit position. Therefore the next two bytes always represent the twelve bit address pointer to the first step of the appropriate test for that circuit. In the scheme of the present invention, the first bit (most significant) of the first byte of the address pointer is used as a generic flag. It will therefore be appreciated that a plurality of roll table elements may point to the same test procedure so that the roll table memory may generate several different names for the same circuit: one of the names being generic; and the remainder of the names being in-house numbers used by various OEMs for that particular circuit. This arrangement allows a significant saving of memory space because identical test procedures do not have to be duplicated in the test procedure memory 22.

As may be seen from the example in FIG. 4A, roll table elements (K), (K+2), and (K+3) are the generic names for three particular circuits. It may also be seen that roll table element (K+2) is a nongeneric or in-house name for the circuit generically identified by roll (K-1). Similarly, roll (K+1) is a nongeneric name for the circuit corresponding to roll (K). Likewise, roll (K+3) is the generic name for a circuit which is also identified by the nongeneric name generated by roll (K+4).

Therefore the preferred embodiment of the present invention provides a tester which operates according to the disclosure of the above-referenced co-pending application which contains both generic and nongeneric names for particular circuits. While the inclusion of a large number of names mapping into the same test procedure will eventually limit the repertoire of the apparatus (depending on the size of roll table memory 29), the choice of which nongeneric names to include in the roll table will be dictated by the environment of the user. However, it will be appreciated that in an apparatus operated according to the present invention, it would waste both time and battery energy to execute a test for each element of the roll table since many of the tests would be executed more than once. Therefore, the operating scheme of the present invention executes tests only for roll table elements containing the generic flag in the most significant bit of the first byte containing the twelve bit address pointer as shown in FIG. 4A.

Figure 4B:
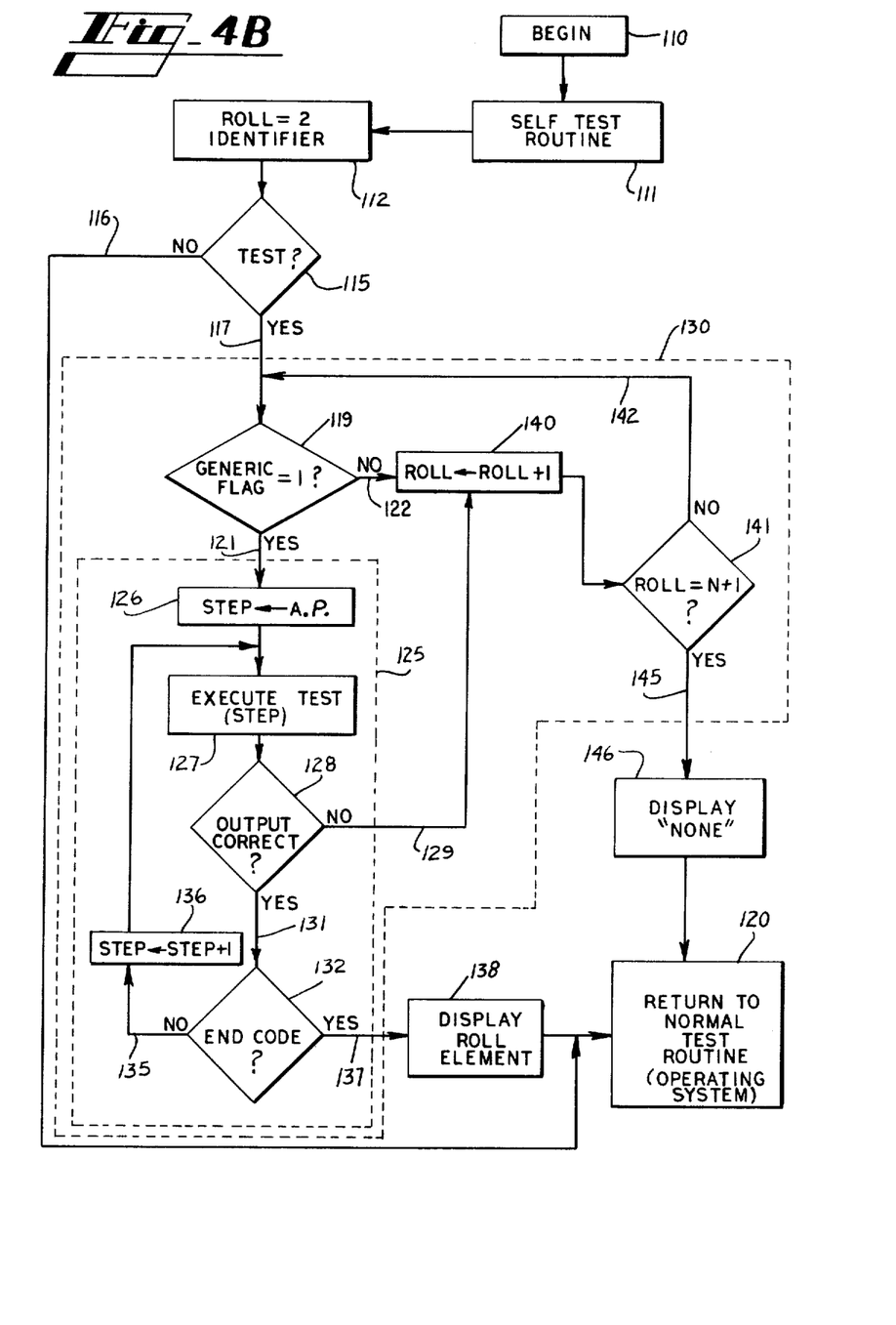
FIG. 4B is a flow diagram of the sequential test procedure of the present invention for identification of a unit under test.

A flow chart of the steps executed by the operating system of the present invention is shown in FIG. 4B. It is to be understood that the routine shown in FIG. 4B is executed by firmware contained in the read only memory of microcomputer 20 and more specifically in the operating system portion 28 of the read only memory of the computer (See FIG. 1).

It is to be understood that the preferred embodiment of the present invention is constructed to be an improvement upon the testing apparatus shown in co-pending application Ser. No. 96,030. It is of course possible to construct other embodiments of the present invention, but it is believed that the best mode of the present invention is constructed according to the present disclosure so that both the identification function of the present invention, together with the testing apparatus of the invention disclosed in said co-pending application, may be advantageously combined since the preferred embodiments of the both inventions both require generation of a roll table and the storage of a plurality of test procedures.

It is therefore to be understood that in the preferred form of the present invention, the routine shown in FIG. 4B is a routine which is called by depression of test switch 11 when the roll table generating scheme disclosed in the above-mentioned co-pending application has incremented the roll table to element number 2. This is shown diagrammatically in FIG. 4B as step 112. It is to be understood that a routine initialization procedure is shown as step 110 in FIG. 4B and that roll table element 1 of the preferred embodiment is a self test routine which may be executed by the apparatus. Therefore, the decisional step 115 shown in FIG. 4B corresponds to the identical TEST decisional step shown as step 110 of FIG. 4 in the co-pending application which is a flow chart for generation of the roll table.

As may be seen from FIG. 4B, the incrementing of the roll table (by a step not shown) is the equivalent of the NO branch 116 from step 115 which causes the preferred embodiment to return to its normal test routine shown as block 120. Once the operator of the preferred embodiment manipulates switches 11, 12 and 13 so as to execute branch 116 shown in FIG. 4B, the preferred form of the present invention will operate as disclosed in the co-pending application.

However, if branch 117 from step 115 is selected by operation of test switch 11 when the roll table element is equal to two, the identifier routine is entered and executed. As may be seen from FIG. 4B, the identifier routine comprises a loop which is bounded by dashed line 130 which, once entered via branch 117, can only be exited after the unit under test has passed an entire test procedure residing in memory 22 (FIG. 2) or until the entire test procedure repertoire has been executed and the unit under test has passed none of the procedures. In the former case, the exit from loop 130 is made on branch 137 and in the latter case the loop is exited on branch 145.

In order to explain the operation of the present invention through the device of the flow chart shown in FIG. 4B, assume for a moment that a circuit whose generic identity corresponds to roll element (K+2) shown in FIG. 4A has been inserted into socket 10 and that branch 117 shown in FIG. 4B was selected so as to enter loop 130. Assume further that loop 130 has been executed to a point where the variable ROLL referred to in steps 140 and 141 of FIG. 4B is equal to (K−1) corresponding to the first roll table element shown in the roll table element of FIG. 4A.

The first step in the loop is conditional branch 119. Since it may be seen from FIG. 4A that the generic flag (the first byte of the twelve bit address pointer) is equal to zero, branch 122 will be taken from conditional step 119. The variable ROLL will be incremented at step 140 and then conditional step 141 will be executed. Step 141 tests to see if the element ROLL is equal to N+1 where N is the number of test procedures stored in memory 22 of FIG. 2. If test 141 is satisfied, it indicates that the entire roll table has been scanned without a successful completion of an entire test for the unit under test and therefore loop 130 is exited along branch 145.

However, in the example given, (K) is less than N+1 so branch 142 is taken from step 141. Again conditional step 119 is executed on roll table element (K) and, as may be seen from FIG. 4A, the generic flag is equal to one. Therefore, branch 121 is taken causing the operating system to enter the test procedure loop bounded by dashed line 125.

The first step of the test procedure loop is to set a variable called STEP with a value corresponding to the address pointer (A.P.) from the roll table. This is shown at step 126 in FIG. 4B. It will be understood that step 126 may be executed by loading the address counter of the microcomputer or by the use of a relative addressing scheme. As may be seen from FIG. 4A, step 126 in the procedure described would load the address of the first step of test L into the register corresponding to the variable STEP.

The next step 127 corresponds to providing a particular set of test conditions defined by first step of test L. As will be appreciated by those skilled in the art, each step recited herein for FIG. 4B may involve a set of conditions defined by more than one byte of test procedure memory 22 but each set of conditions for which an output is tested is to be considered one step according to the flow chart of FIG. 4B.

Conditional step 128 tests to see if the correct output for test L is present on appropriate pins of socket 10. Assume for the moment that the unit under test provides the correct output for the first set of test conditions and therefore branch 131 will be taken. The next step shown in FIG. 4B is conditional to see if the END code is present indicating that the entire test L has been executed. Since this will not be the case in the present example, branch 135 will be taken and the variable STEP will be incremented at step 136. Therefore the operating system will fetch the next set of conditions defined as part of test procedure L from test procedure memory 22 and will again test for the correct output. Assume this is the step that fails, and therefore the system will take branch 129 from conditional step 128.

Branch 129 leads to step 140, incrementation of the roll table which now makes the variable roll equal to (K+1). Again, branch 142 is taken from conditional test 141 leading back to the generic flag test of step 119. Since FIG. 4A indicates that the generic flag for roll table element (K+1) equals 0, branch 122 is taken incrementing the roll table to a value of (K+2).

As may be seen in FIG. 4A, the generic flag does equal one for roll table element (K+2) and therefore branch 121 is taken into test procedure loop 125.

As may be seen from FIG. 4A, the twelve bit address pointers associated with roll table element (K+2) points to (L−1) and therefore the variable STEP will be loaded, at step 126, with a number corresponding to the address of the first step of test (L−1).

Since, in the present example, it is assumed that the unit under test is of the type corresponding to roll element (K+2) it will be appreciated from the foregoing that loop 125 will be successfully executed until the last step of step (L−1) is reached. When this occurs, the yes branch 137 from conditional step 132 is taken leading to branch 138 entitled "display roll element".

At this step the roll table element (K+2) is provided in display 16 (FIG. 1) and thus the unit under test has been successfully identified by its generic name corresponding to roll table element (K+2).

When the display step is completed, the operating system returns the apparatus to its normal test procedure as shown at block 120.

From the foregoing it will be appreciated that when the unit under test is a circuit for which no test procedure resides in test procedure memory 22, or which is malfunctioning so as not to pass any one of the plurality of test procedures, eventually loop 130 will be exited via branch 145 from conditional step 141 when the roll table is exhausted. In this instance, step 146 displaying the word "NONE" is executed showing that the unit under test failed to satisfy any test procedure resident in the device. Upon this display, control is again returned to the normal test procedure routine of the operating system.

From the foregoing it will be appreciated that memory 22 (FIG. 2) contains a plurality of test procedures, exemplary ones of which are shown as (L−1) throug (L+1) in FIG. 4A. It will further be appreciated that each of the test procedures comprises a plurality of test conditions which are sequentially provided, one at a time, through the steps comprising test procedure loop 125 of FIG. 4B.

It will further be appreciated that each of the plurality of test conditions defined for any one test procedure correspond to input drive for pins defined as inputs, output loading for pins defined as outputs, power supply conditions corresponding to the provision of appropriate voltages at power supply pins, and grounding of power supply ground pins.

It should be understood that the implementation of the operating system as shown in FIG. 4B in practice operates much faster than might first be assumed. Note that a test procedure is initiated at step 126 each time a generic flag is encountered in the roll table at conditional step 119. However, it will be apparent from the structure of the operating system shown in FIG. 4B that each test procedure is executed via test procedure loop 125 only to the point at which a particular set of conditions fails to provide the appropriate output. When this occurs, branch 129 is taken and the roll table is incremented until the next generic flag is encountered.

In practice it will be appreciated that normally only a very few steps (corresponding to sequential values of the variable STEP in loop 125) are executed until a device fails and the next test procedure is begun.

In the embodiment shown, each set of conditions may be set up and tested, that is, execution of steps of 127–132, in approximately one millisecond. On the assumption (which holds true in practice) that each improper test procedure will be failed during one its initial steps, it will be appreciated that the entire repertoire of test procedures may be applied to a unit under test in a manner of several hundred milliseconds.

In order to appreciate the great celerity with which the present invention may execute the steps shown in FIG. 4B to define input and output parameters for various pins of socket 10, the interfacing between the unit under test plugged into socket 10 and the operating system resident in microcomputer 20 will now be explained in reference to FIGS. 3 and 5.

Among the novel features of the interface between microcomputer 20 and the unit under test are the manner in which inputs and outputs are defined and provided to the unit under test, and the new and nonobvious way of interconnecting a microcomputer and an I/O/memory device such as the type 8755A shown in the preferred embodiment.

Figure 5:
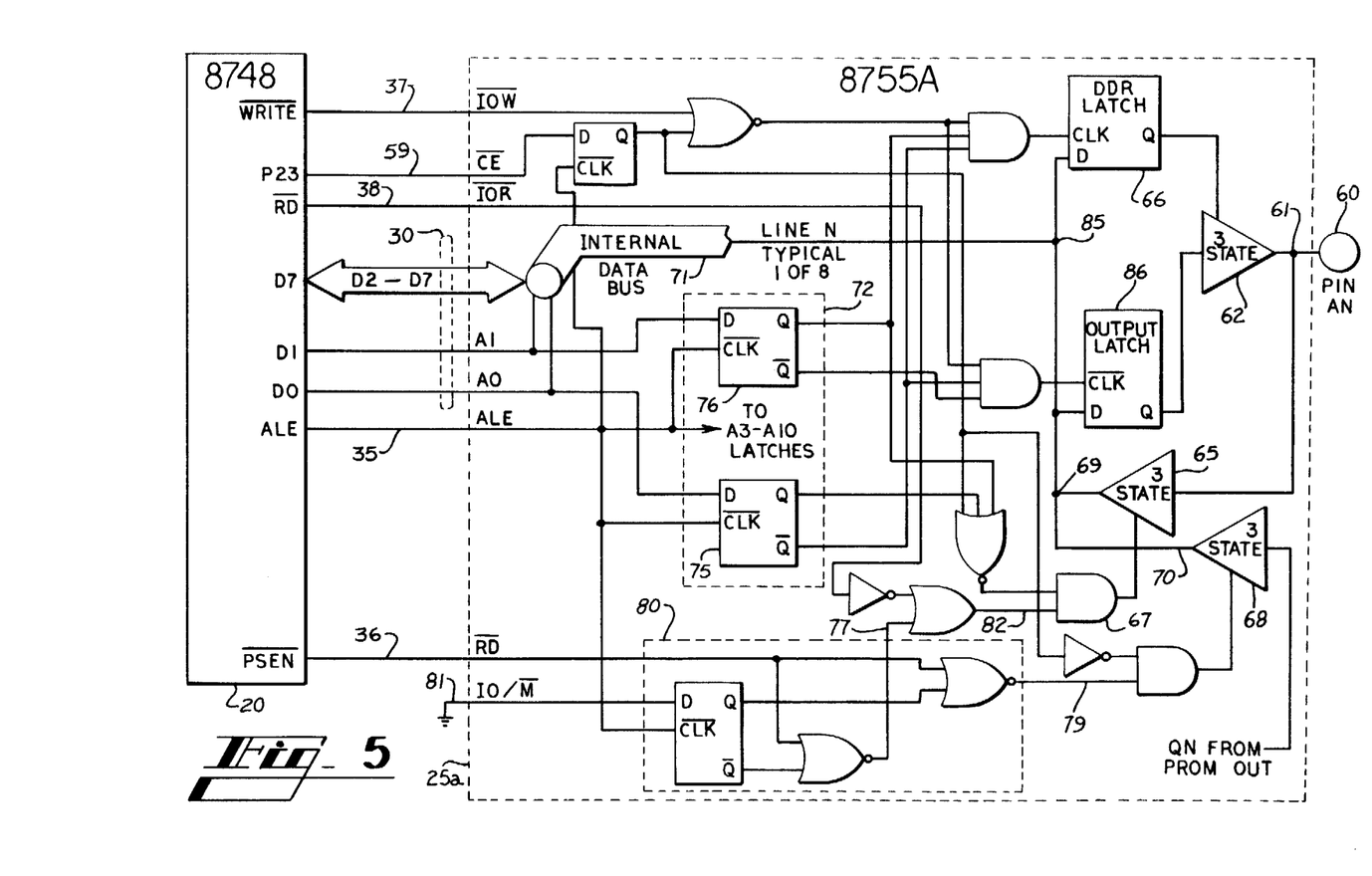
FIG. 5 is a diagram of the interface between a particular pin of the socket holding the unit under test and the preferred embodiment of the present invention.

From FIG. 5 it will be apparent to those skilled in the art that the interconnection of microcomputer 20 and I/O/memory device 25a is novel as set forth in the above-referenced copending application. For example, note that the connection of the negated read (RD) output of microcomputer 20 to the negated I/O/READ (IOR) input of chip 25a and the connection of the program store enable (PSEN) output of microcomputer to the read (RD) input of chip 25a are not suggested in any standard scheme for connecting the 8755A to a computer. Particularly, such connections would not be used in either a standard I/O arrangement or a memory mapped I/O arrangement. When IOR is active, it causes the data at a port, such as I/O port 46, to be read onto bus 30 and thus is a port read input.

The scheme of interconnecting microcomputer 20 and I/O/memory devices 25a and 25b is one of the features of the present invention which allows the preferred embodiment to be made quite small while at the same time storing test routines for one hundred or more devices. In particular, the means for interconnecting microcomputer 20 and I/O/memory devices 25a and 25b provide an addressing scheme wherein the microcomputer 20 treats accessing the I/O ports of chips 25a and 25b analogously to reading into or writing from external random access memory for a normal connection in a microcomputer system.

Similarly the interconnection of the negated program store enable (PSEN) from microcomputer 20 to the negated read input of chips 25a and 25b along line 36 assures that reading from the PROM portions of chips 25a and 25b only occurs when microcomputer 20 is fetching an instruction from external memory. As will be appreciated by those skilled in the art, the program store enable output of microcomputer 20 becomes active only when said microcomputer is making such a fetch. It will therefore be appreciated that the interconnection shown in FIGS. 3 and 5 provides a uniquely interconnected combination of standard devices which provides for treatment of the I/O ports of I/O/memory chips 25a and 25b as programmable interface adapters and the memory portions of I/O/memory chips 25a and 25b as program memory for the microcomputer. Furthermore, since in a preferred embodiment of the present invention, only instructions for test routines are stored in 25a and 25b, these chips together with the unit under test are not powered up during the previouslydescribed operation of the roll table. Thus, a considerable saving of battery power is provided.

Turning now to FIG. 5, the functional manifestations of the unique interconnection between microcomputer 20 and I/O/memory chips 25a and 25b will be explained. FIG. 5 shows, by way of example, the internal logical equivalent of a particular pin designated AN of output port A of I/O/memory device 25a. It will be understood by those skilled in the art that the portions of FIG. 5 bounded by the block 25a show logical equivalents of the actual type 8755A currently available.

Pin AN designated as 60 on FIG. 5 should be understood to be one pin of I/O port A of chip 25a. Therefore, it will be understood that one line from bus 46 (FIG. 3) is connected to pin 60. Pin 60 is electrically connected to a point 61 which is both the output of a three state buffer 62 and the input to a three state buffer 65. Data direction latch (DDR) 66 controls the output of buffer 62 and AND gate 67 controls the output of buffer 65.

Another three state buffer 68 is connected to point 69 which may be seen from FIG. 5 to be on the internal data bus of the 8755A chip. Buffer 68 carries the Nth output line from the outputs of the PROM of the 8755A. Therefore, line 70 carries the Nth bit of the output word from this PROM to the internal data bus 71 of the 8755A.

As will be appreciated by those skilled in the art, a plurality of latches designated as 72 are the address latches internal to an I/O/memory device such as the 8755A. The latches for the two least significant bits are shown in FIG. 5 as 75 and 76. These latches contain a two bit pointing vector which determines the source and destination of data for the internal data bus 71.

Latch 75 latches the least significant bit of data bus 30 when the address latch enable signal on line 35 exhibits a trailing edge. A zero in latch 75 points to port A of the 8755A and a one points to port B. Therefore as will be appreciated from FIG. 5, a zero must be latched into latch 75 for the exemplary pin 60 to be affected during subsequent operations while the ALE line is low.

Latch 76 latches a bit which points either to data direction register 66 (when a one is latched), or to output latch 86 (when a zero is latched).

It will be appreciated by those skilled in the art that the circuitry enclosed in block 80 of FIG. 5 is such that the grounding of the I/O/M pin 81 causes the following results. During all operations of the 8755A after power is supplied and after the first strobing of line 35, line 77 will always remain a zero and therefore line 82, which in part controls the three state buffer 65 through AND gate 76, will simply be the logical inverse of line 38 to the negated IOR input. The grounding of input 81 also assures that line 79 is simply the logical inverse of the read (RD) input from line 36. Therefore, when microcomputer 20 provides an active output on line 36 (logical zero) indicating that an instruction to be executed is being fetched from an external memory, line 79 will become a logical one and at point 69, the QN output from the PROM will be placed on the internal data bus of the 8755A and thus on bidirectional data bus 30.

Whenever a write operation is to take place from microcomputer 20, the data present at point 85 on line N of the internal data bus will be written into either the data direction register 66 or the output latch 86. The particular one of the latches 66 or 86 into which data is written is determined solely by the latched vector in address latch 72. Therefore, in testing a particular unit under test, the first write instruction from microcomputer 20 is one in which the latched output of address latch 76 is a one, thus enabling writing into data direction latch 66.

As will be apparent from FIG. 5, a zero written into data direction latch 66 disables buffer 62 (places its output in a high impedance state) thus defining pin 60/as an output pin of the unit under test. All subsequent write (line 37 going low) operations from microcomputer 20 will be those which will write into output latches for each pin of ports A and B. With a zero in DDR latch 66, data written into the output latch 86 will be ignored since this data cannot pass through buffer 62. Of course, some of the other pins are presumed to have had ones written into the data direction latches associated therewith and thus have been defined as inputs for the unit under test. These pins will have data from the latch associated therewith (which corresponds to output latch 86 shown in FIG. 5) placed onto the pin upon each write operation.

Any read operation from microcomputer 20 which is not accompanied by a program store enable pulse on line 36 will read the data present on pin 60. This data is at point 69 and thus on the internal data bus 71 of the 8755A. It will therefore be appreciated that a latched vector in latches 75 and 76 will point to a data direction latch during the first write operation from microcomputer 20 during a specified test.

From that point on, the contents of the data direction latches, such as latch 66 shown in FIG. 5, will determine which pins from the I/O ports of the 8755As are inputs and which pins are outputs. Subsequent write operations will write into the output latches for the I/O port. All subsequent read operations will either: (1) read the pins of the I/O ports; or (2) read an externally stored instruction from the PROM of the 8755A into microcomputer 20.

It will therefore be appreciated that once the contents of the data direction latches have been determined, a read operation will read from the PROMs of the 8755A chips when line 36 is low and will take data from the I/O ports when line 36 is high. It will thus be appreciated that the unique interconnection between microcomputer 20 and I/O memory chip 25 which is shown in the preferred embodiment of the present invention allows the treating of the I/O ports of the 8755As as programmable interfaces. This connection has allowed microcomputer 20 to activate (logical zero) line 38 and require only the program store enable control to determine whether data from the I/O port is to be read or a word is to be outputed from the PROM of the 8755A.

Instruction Format for Test Procedures

Figure 6:
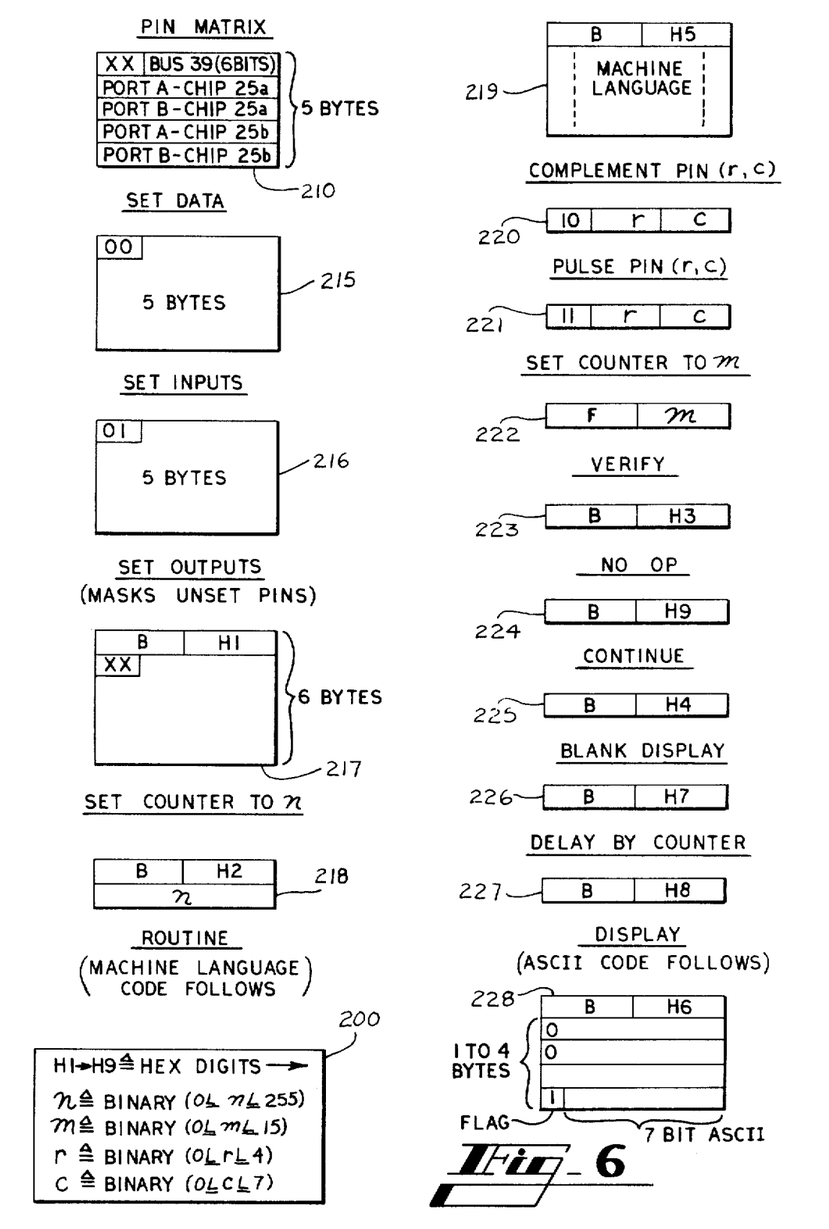
FIG. 6 is a diagram of the instruction format for the test routine stored in the test procedure memory in the preferred embodiment of the present invention.

FIG. 6 shows the format for test procedure instructions residing in test procedure memory 22 (FIG. 2).

It will be appreciated by those skilled in the art that instructions generated in this format in test procedure memory 22 will be executed in the preferred embodiment by the 8748 microcomputer 20 to actually implement the test procedures described herein. Given the teaching of the present specification and the format shown in FIG. 6 and described hereinbelow, one skilled in the art will appreciate that an operating system including an appropriate interpreter may be readily written for read only memory 28 (FIG. 1) to implement the procedure shown in FIG. 4B.

The best mode of practicing the present invention which makes the most economic use of memory space available is the disclosed arrangement wherein socket 10 is designed to accept SEM, or SEEM modules. It is well known that such modules have dedicated power supply and ground pins and thus 38 pins may variously be inputs outputs and unconnected.

It will be appreciated from the following that the instruction format shown in FIG. 6 is allowed to be compacted to make maximum use of the memory space of the test procedure memory 22 by virtue of having two dedicated pins. It will further be apparent to those skilled in the art that an embodiment of the present invention in which forty or more pins are definable may be constructed and, based on the teaching herein, an instruction format for the test procedures may be arranged which (in certain cases) will require one extra byte of memory space for the instructions.

Turning now to FIG. 6, block 210 shows a generalized format for one of the three instructions which sets the states of the input/output pins as described hereinabove in connection with FIG. 5. As shown at block 210 labeled "pin matrix", this instruction format consists of five eight-bit bytes wherein the two most significant bits of the first byte will define the instruction and the remaining bytes will select which elements of the matrix are to be set according to the instruction defined by the above mentioned two bits. There is a direct correspondence between the elements of the pin matrix shown at block 210 and the connections to socket 10 (FIG. 3). In instructions having the format of block 210, the remaining six bits of the first byte of the instruction have a one-to-one correspondence with the six pin receptacles connected to bus 39 shown in FIG. 3. The next byte of the pin matrix bears a one-to-one correspondence with the eight lines comprising bus 46 connected to port A of 8755A chip 25a. As may be seen from FIG. 6, the remaining rows of the pin matrix correspond to the remaining ports of the 8755As.

Blocks 215 and 216 of FIG. 6 show instructions SET DATA, and SET INPUTS, respectively. As may be seen therefrom, the SET DATA instruction is identified by two zeros in the most significant positions of the first byte and the SET INPUTS instruction is identified by 01 in that position. The remainder of these instructions constitute the pin matrix shown in block 210.

It will therefore be appreciated that the SET INPUTS instruction 216 will have the following effect. For each position of the pin matrix at which a one appears, this instruction will be processed by microcomputer 20 having the ROM content set forth in table 2 to define those particular elements of the pin matrix as inputs. From the foregoing discussion of FIG. 5, it will be appreciated that this will cause a one to be written into the data direction latch 66 for each pin so defined as an input thus enabling the buffer 62 associated with that pin so that the contents of output latch 86 may be applied to the pin 60 in order to drive an input to the unit under test.

SET DATA instruction 215 defines the expected inputs and outputs at each pin of the pin matrix for the next test to be executed on the unit under test.

A SET OUTPUTS instruction shown at block 217 may be needed for certain types of devices.

Microcomputer 20 upon interpreting and executing a set inputs instruction will cause all of the pins not defined as inputs to be defaulted to a definition of outputs. For some types of devices, certain pins may not properly be treated as either inputs or outputs. Therefore the combination of a SET INPUTS instruction 216 and a SET OUTPUTS instruction may be used and the SET OUTPUTS instruction should be understood to mask any pins not defined as outputs.

It will therefore be appreciated that if a SET INPUTS instruction defining half of the pins as inputs is provided, followed by a SET OUTPUTS instruction wherein the remaining half, save one, are defined as outputs; the one pin not defined as an output will be ignored during the next occurring test applied to the unit under test. The SET OUTPUTS instruction 217 requires an entire byte consisting of the hex numbers B, H1 to precede the pin matrix. Thus it will be appreciated that in an arrangement which selectively defines forty pins, the SET OUTPUTS instruction may be retained in its same format with the first two bits of the second byte being used to define the remaining two pins which are dedicated in the preferred embodiment described herein.

Once the instructions 215, 216 and, optionally, 217 have been provided, a test may be conducted on the unit under test. This is executed in response to the VERIFY command 223 having a first nibble as hex B and the second nibble as hex H3.

If a different set of instructions 215, 216, and 217 is required, this may again be executed. However, it will be appreciated from the length of those instructions that selectively changing individual pins with one-byte instructions can in many instances make better use of the test procedure memory space. Therefore the COMPLEMENT PIN (r,c) instruction 220 and the PULSE PIN (r,c) instruction 221 are provided. As may be seen from definitional block 200 of FIG. 6, r is a binary number between zero and four defining one of the five rows of the pin matrix shown at 210. Thus r will have a value between 000 and 100. Block 200 also shows that the column element, c, is any three bit binary number between 0 and 7 (000,111).

The instructions shown at 220 and 221 will complement or pulse the pin having the row and column number defined by the remaining six bits. It will readily be appreciated that COMPLEMENT PIN instruction 220 simply inverts the value for that particular pin (r,c) that was previously defined by a SET DATA instruction 215.

The PULSE PIN instruction 220 causes the particular pin (r,c) to be pulsed. If the counter has been set by one of instructions 218 or 222, the particular pin (r,c) will be pulsed that number of times.

The SET COUNTER instructions 218 and 222 may be used to set a counter internal to the 8748 to any value between 0 and 255. As may be seen from instructions 218 and 222 and the definitionS set forth in definitional block 200, instruction 222 may be used whenever the number to be loaded in the counter is less than sixteen. When the counter is to be loaded with a number between 16 and 255, the two byte instruction, 218, is required. For a SET COUNTER instruction to either m or n, m+1 and n+1 counts, respectively, are provided.

It will therefore be appreciated that a test procedure will generally be introduced by a series of the set instructions 215, 216 and possibly 217. Subsequently, a VERIFY instruction 223 will be provided.

If the unit under test is successful in supplying all of the data and accepting the inputs which were defined by the SET DATA instruction 215, either new set instructions or complement and pulse instructions 220 and 221 may then be listed, to be followed by a subsequent VERIFY instruction. Thus it may be seen that, in fairly compact code, one skilled in the art can easily construct a test routine which will be adequate to verify whether the unit under test is operating properly.

The remaining instructions of the test procedure instruction set are also shown on FIG. 6. The ROUTINE instruction 219 indicates that the bytes following the instruction code hex B, hex H5, are in machine language. The last machine language bytes of an instruction in the format of 219 will be understood to be a machine language JUMP instruction which will return the 8748 to its mode of interpreting the instructions shown in FIG. 6.

The NO OP instruction 224 simply causes the program to continue execution. Similarly, BLANK DISPLAY instruction 226 requires no explanation.

DELAY BY COUNTER instruction 227 is executed to cause the present state of the outputs at socket 10 to remain unchanged until the counter value (set by a previous SET instruction) counts down to zero.

The CONTINUE instruction 225 indicates that the next SET INPUTS instruction is in the same test procedure and therefore the last VERIFY instruction should not be treated as the end of the present test procedure.

The last instruction is the DISPLAY instruction shown at 228. The occurrence of the byte B, H6, indicates that the following bytes contain six or seven bit ASCII code, the alpha-numeric equivalent of which is to be displayed. The most significant bit of this ASCII is used as a flag as is shown at block 228 and a one occurring at this bit position is indicative of the last byte of the ASCII code to be displayed.

The following table illustrates the relation between the first nibble of the instruction set, the hex number quivalents, and the corresponding instruction:

TABLE 1

| First Four Bits of First Byte | Hex Equiv. | Instruction |
|---|---|---|
| 1011 | B | Any of BH1-BH9 |
| 00XX | 0-3 | SET DATA |
| 01XX | 4-7 | SET INPUTS |
| 1111 | F | SET COUNTER to m |
| 1000 | | |
| 1001 | 8-A | COMPLEMENT |
| 1010 | | |
| 1100 | | |
| 1101 | C-E | PULSE |
| 1110 | | |

Inspection of Table 1 in conjunction with FIG. 6 will show that the first four bits of any instruction set forth on FIG. 6 define a hex number which unambiguously determines the nature of the instruction. Note that the instructions 215, 216, 220, and 221 each may provide several possible combinations for the most significant nibble of the first byte. The SET DATA and SET INPUTS instructions are identified by any hex digit between zero and three, and four and seven, respectively.

Any instruction having hex B as the first nibble may be interpreted to check the second nibble in order to ascertain the particular instruction. Likewise, an occurrence of hex F is treated the same way.

The use of the row/column format in instructions 220 and 221 is one of the advantages of the present invention which allows for very compact encoding of the test procedure instructions. It will be readily apparent that these instructions will occur very frequently in a test routine. Since the matrix only has five rows and the number r can only take values between zero and four, it will readily be appreciated that COMPLEMENT PIN instruction 220 can generate a first nibble value between 8 and A but cannot reach B, since this would correspond to complementing a pin in row six or seven, which does not exist. Similarly, the PULSE PIN instruction 221 starts with C but since it is followed by the row number r, hex E is the largest value the first nibble may take.

It will be readily appreciated that the apparatus disclosed herein lends itself to testing a circuit to ascertain if it is a member of a predetermined set of possible circuits. For example, if test procedure memory 22 is loaded to contain test routines for all circuit modules for a particular piece of equipment, such as a given airplane, the following procedure can be used. The user need only pull and test each module to ascertain if it passes any test in the repertoire. If it passes any test, the identification displayed may be considered a "go" signal. If the device fails to pass any test it is defective since the test routines for all possible modules have been applied. Thus, it is to be understood that identification as used herein includes identification of a circuit as a working member of a known predetermined population of circuits.

While the foregoing has presented full and complete instructions for constructing the preferred embodiment of the present invention, it will be appreciated by those skilled in the art that other microcomputers and other similar devices may be used to construct an embodiment of the present invention in light of the teachings of this specification. Therefore the scope of the present invention is to be limited only by the claims below.

I claim:

1. Apparatus for identifying a circuit having a known pin configuration and an unknown transfer characteristic among said pin configuration comprising:
a socket comprising a plurality of receptacles for holding said pin configuration;
bidirectional port means electrically connected to said socket, said bidirectional port means being selectively operable for providing input drive, output loading, and power supply conditions among said plurality of receptacles;
storage means for storing data corresponding to a plurality of input and output parameters for a plurality of circuits of known identity;
operating means connected to said storage means and responsive to said data for operating said bidirectional port means to provide said input drive, said output loading, and said power supply conditions corresponding to said input and output parameters sequentially for each of said plurality of circuits of known identity; and
testing means to control said operating means and to provide an identity signal in response to detection of said data corresponding to said input and said output parameters for one of said plurality of circuits of known identity.

2. Apparatus as recited in claim 1 wherein said bidirectional port means comprises a programmable input/output port with a plurality of inputs/outputs each connected to one of said plurality of receptacles, a data direction latch to control each said input/output and thereby render said input/output operative as an input and alternately operative as an output, and an output latch operatively connected to each said input/output when said input/output is rendered operative as an output.

3. Apparatus as recited in claim 2 wherein said operating means comprises a microcomputer including a data/address bus connected to said storage means for accessing said data;
said data/address bus being further connected to said bidirectional port means and responsive to said data to load each said data direction latch and subsequently to load each said output latch for those said inputs/outputs rendered operative as outputs.

4. Apparatus for identifying a circuit having a known pin configuration and an unknown transfer characteristic among said pin configuration comprising:
socket means comprising a plurality of receptacles for holding said pin configuration;
memory means for storing a plurality of test procedures;
operating means operatively connected to said memory means and selectively operable for sequentially providing, one at a time, a plurality of test conditions to said socket means in response to each of said plurality of test procedures; and
identification means responsive to output supplied to said socket means by said circuit for providing a particular identification output in response to detection of a specific predetermined set of said outputs from said plurality of receptacles at said socket means in response to said plurality of test conditions corresponding to a particular test procedure.

5. Apparatus for identifying and testing a circuit having a known pin configuration comprising:
a socket comprising a plurality of receptacles for holding said pin configuration;
a programmable bidirectional port including a plurality of inputs/outputs electrically connected to said plurality of receptacles, a plurality of three state buffers connected to said plurality of inputs/outputs for rendering said plurality of inputs/outputs selectively operable for providing input drive, output loading, and power supply conditions among said plurality of receptacles and a plurality of data direction latches controlling said buffers;
storage means for storing data corresponding to a plurality of input and output parameters for a plurality of circuits of known identify;
operating means comprising a microcomputer connected to said storage means and said programmable bidirectional port for sequentially accessing said data and in response thereto operating said plurality of data direction latches to provide said input drive, said output loading, and said power supply conditions corresponding to said input and output parameters sequentially for each of said plurality of circuits of known identity; and testing means to control said operating means and to provide an identity signal in response to detection of a set of said data corresponding to said input and said output parameters for one of said plurality of circuits of known identity.

* * * * *